United States Patent
Elmqvist Wulcan et al.

(10) Patent No.: US 9,430,509 B2
(45) Date of Patent: Aug. 30, 2016

(54) EVENT TIMELINE GENERATION

(71) Applicant: Axis AB, Lund (SE)

(72) Inventors: Elias Elmqvist Wulcan, Malmö (SE); Oskar Gustafsson, Malmö (SE); Zacharias Enochsson, Lund (SE)

(73) Assignee: Axis AB, Lund (SE)

( * ) Notice: Subject to any disclaimer, the term of this patent is extended or adjusted under 35 U.S.C. 154(b) by 92 days.

(21) Appl. No.: 14/028,218

(22) Filed: Sep. 16, 2013

(65) Prior Publication Data

US 2015/0081706 A1    Mar. 19, 2015

(51) Int. Cl.
*G06F 17/30* (2006.01)
*G05B 23/00* (2006.01)
*G06F 11/32* (2006.01)

(52) U.S. Cl.
CPC ......... *G06F 17/30321* (2013.01); *G05B 23/00* (2013.01); *G06F 11/323* (2013.01); *G06F 17/30551* (2013.01); *G06F 17/30598* (2013.01)

(58) Field of Classification Search
CPC ................................................ G06F 17/30598
See application file for complete search history.

(56) References Cited

U.S. PATENT DOCUMENTS

| | | | |
|---|---|---|---|
| 7,562,299 B2* | 7/2009 | Millar et al. | 715/719 |
| 2005/0132414 A1* | 6/2005 | Bentley et al. | 725/105 |
| 2006/0143206 A1 | 6/2006 | Lock et al. | |
| 2006/0195876 A1* | 8/2006 | Calisa | 725/105 |
| 2006/0221184 A1* | 10/2006 | Vallone et al. | 348/155 |
| 2007/0033632 A1* | 2/2007 | Baynger et al. | 725/135 |
| 2009/0199113 A1* | 8/2009 | McWhinnie et al. | 715/762 |
| 2013/0039634 A1* | 2/2013 | M | 386/230 |

FOREIGN PATENT DOCUMENTS

| | | |
|---|---|---|
| WO | 2008052133 A2 | 5/2008 |
| WO | 2011024163 A1 | 3/2011 |
| WO | 2011112917 A2 | 9/2011 |

OTHER PUBLICATIONS

IEEE, Yang Zhang et al., "ICEDB: Intermittently-Connected Continuous Query Processing" p. 166-173 (2007).
Roger S. Barga et al: "Consistent Streaming Through Time: A Vision for Event Stream Processing", Dec. 21, 2006, XP055137111, URL: http://arxiv.org/abs/cs/0612115, entire document.
Qunzhi Zhou et al: "SCEPter: Semantic Complex Event Processing over End-to-End Data Flows", Apr. 1, 2012, XP055137032, URL: http://www.cs.usc.edu/assets/001/82856.pdf.
European Search Report dated Sep. 5, 2014, issued in corresponding European Application 13185557.9, 8 pages.

* cited by examiner

*Primary Examiner* — Khanh Pham
(74) *Attorney, Agent, or Firm* — Snyder, Clark, Lesch & Chung, LLP

(57) ABSTRACT

A method selects events from an event log for presentation along a timeline. The method may receive information associated with the timeline to define an interval of interest and a partition size, and divide the timeline into a plurality of segments based on the partition size. The method may further identify each segment having at least one relevant event within the segment, where a relevant event is an event which starts within a segment and overlaps with the interval of interest. The method may determine parameters associated with at least one relevant event for each identified segment, and provide the determined parameters along with an index which designates each identified segment. The determined parameters may be provided to a client to generate the timeline of the at least one relevant event. An apparatus can implement the method to select events from an event log which are associated with a defined time interval.

21 Claims, 9 Drawing Sheets

EVENT TIMELINE GENERATION

BACKGROUND INFORMATION

Data collection and control systems are increasingly being used across a wide spectrum of applications to monitor and/or control various spaces, facilities, and/or processes. These data collection systems can take advantage of contemporary peripheral devices, which may produce large amounts of data in either digital and/or analog formats. Corresponding advances in processing power and data storage capability permit the collection of multiple data streams over long periods of time, thus generating significant amounts of data for storing.

SUMMARY

One embodiment disclosed below includes a method for selecting events from an event log for presentation along a timeline. The method may receive information associated with the timeline to define an interval of interest and a partition size, and divide the timeline into a plurality of segments based on the partition size. The method may further identify each segment having at least one relevant event therein. A relevant event may be an event which starts within a segment and overlaps with the interval of interest. The method may determine parameters associated with the at least one relevant event for each identified segment, and provides the determined parameters along with an index which designates each identified segment. The determined parameters and the index may be provided to a client to generate the timeline of the at least one relevant event.

In another embodiment, the method may determine the parameters associated with at least one relevant event for each identified segment by performing the following. Additionally, the method may determine an earliest start time associated with the at least one relevant event, determine a latest end time associated with the at least one relevant event, and determine a count of the at least one relevant event. The method may further identify one or more segments by querying the event log to determine events which overlap with the interval of interest to identify events of interest. The method may query the event log for each segment to ascertain whether any events of interest start in the queried segment, and if so, may classify the ascertained events as relevant events for the queried segment.

In yet another embodiment, the method may include receiving information defining an interval of interest may include receiving a start time and an end time to define the interval of interest on the timeline. The received start time, end time, and partition size may be initially defined graphically at the client.

In another embodiment, the events are represented by data generated by at least one peripheral device. The method may further include classifying events based on their associated peripheral device, and filtering events based on the classification. The peripheral device may collect image data, video data, or a combination thereof, along with time data consistent with the timeline. The method may filter events based on metadata associated with the image or video data, including frames-per-second, resolution, format, and associated audio data. The peripheral device may include a camera, a window sensor, a door sensor, a temperature controller, a proximity sensor, or any combination thereof.

In yet another embodiment, the method classifies events based on the information determined from the generated data and filters events based on the classification. The filtering may be based on metadata generated by the peripheral device, where the metadata includes position of the peripheral device, identification of the peripheral device, and a media type associated with the event.

Another embodiment includes an apparatus for selecting events from an event log which are associated with a defined time interval. The apparatus may include a processor and a memory coupled to the processor. The memory stores instructions that cause the processor to do the following. The processor may receive information associated with a timeline to define an interval of interest and a partition size. The processor may divide the timeline into a plurality of segments based on the partition size, and identify each segment having at least one relevant event therein. A relevant event may include an event which starts within a segment and overlaps with the interval of interest. The processor may determine parameters associated with the at least one relevant event for each identified segment, and provide the determined parameters along with an index which designates each identified segment. The processor may provide the determined parameters and the index to a client so it may generate the timeline of the at least one relevant event.

In another embodiment, the instructions for determining parameters associated with at least one relevant event for each identified segment may include cause the processor to determine an earliest start time associated with the at least one relevant event and determine a latest end time associated with the at least one relevant event, and determine a count of the at least one relevant event.

In yet another embodiment, the instructions for identifying may cause the processor to query the event log to determine events which overlap with the interval of interest to identify events of interest, and query the event log for each segment to ascertain whether any events of interest start in the queried segment, and if so, classify the ascertained events as relevant events for the queried segment.

In another embodiment, the instructions for receiving information defining an interval of interest may cause the processor to receive a start time and an end time to define the interval of interest on the timeline. The received start time, end time, and partition size may be initially defined graphically at the client.

In yet another embodiment, the events are represented by data generated by at least one peripheral device. The processor may classify events based on their associated peripheral devices, and filter relevant events based on the classification. The at least one of the peripheral devices collects image data, video data, or a combination thereof, along with time data consistent with the timeline. The processor may filter events based on metadata associated with the image or video data, including frames-per-second, resolution, format, and associated audio data. In yet another embodiment, the processor may classify events based on the information determined from the generated data, and filter relevant events based on the classification.

In another embodiment, the filtering may be based on metadata generated by the at least one peripheral device, where the metadata may include: position of the peripheral device, identification of the peripheral device, a media type associated with the event. The peripheral device may include a camera, a window sensor, a door sensor, a temperature controller, proximity sensor, or any combination thereof.

Other embodiments are described below. That is, for clarity, not all embodiments are described above.

DETAILED DESCRIPTION

The following detailed description refers to the accompanying drawings. The same reference numbers in different drawings identify the same or similar elements.

Given the large amount of data control systems may generate and storeover arbitrary time periods, retrieving and processing the stored data can become resource intensive, particularly in terms of processing and/or network resources. For example, when a user attempts to access and review data associated with a particular event selected from a large number of events over a network, conventional techniques for retrieving the data may introduce a noticeable delay prior to presenting the data to the user.

Embodiments described below relate generally to processes and systems that can perform efficient data retrieval, and more specifically, may relate to data collection and control systems (such as, for example, distributed physical access control systems). Embodiments described below include peripheral devices. The peripheral devices may include any type of monitoring device such as imaging sensors or video cameras, which can produce large amounts of data. The embodiments presented may perform efficient retrieval of events from an event log by, for example, reducing the amount of data used to characterize the retrieved events. The retrieved data may be used, for example, by a client device requesting the data to generate a timeline associated with the retrieved events.

Figure 1:
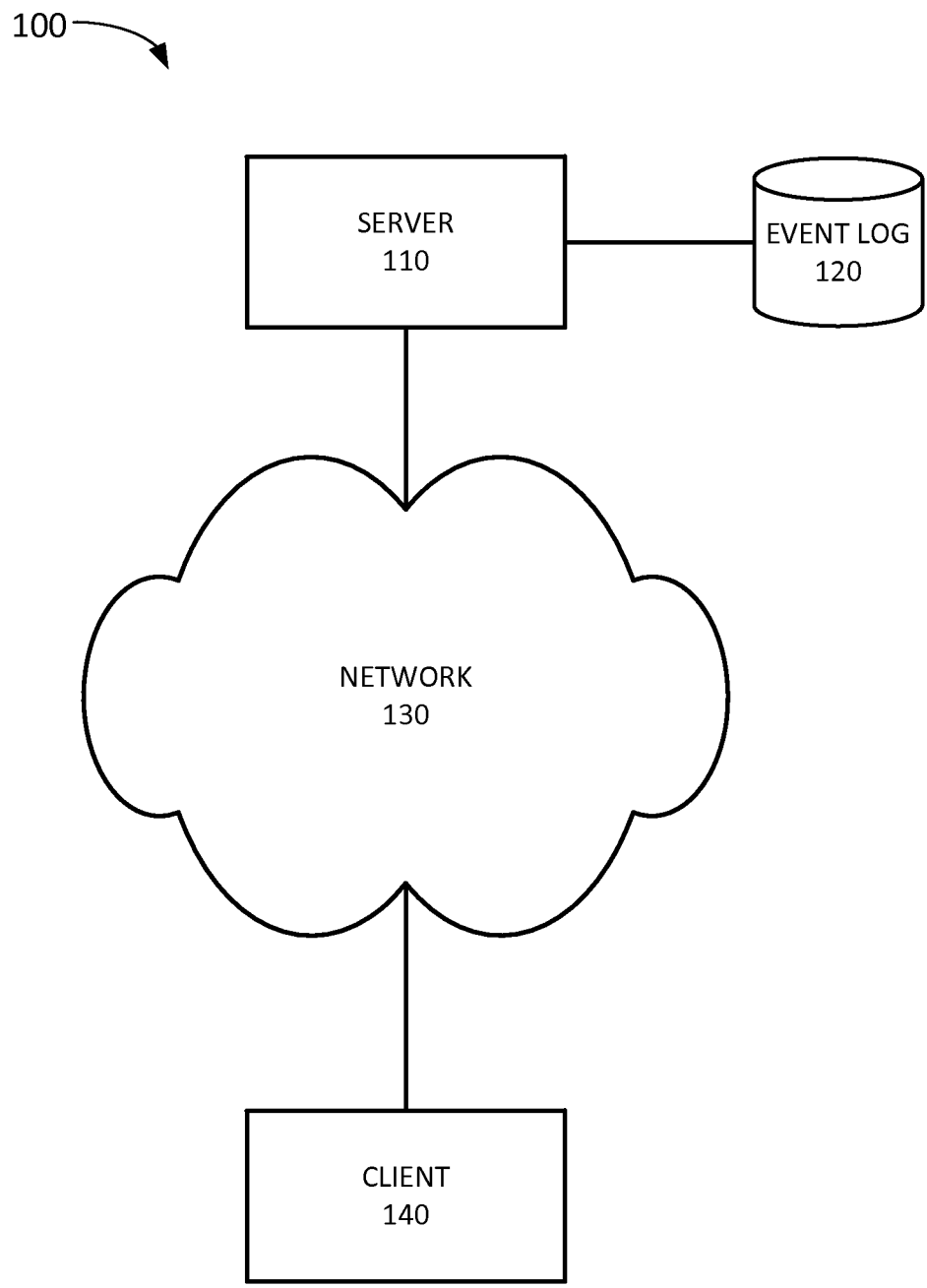
FIG. 1 is a block diagram illustrating an exemplary client-server environment which may perform efficient retrieval of events for event timeline generation.

FIG. 1 is a block diagram illustrating an exemplary environment 100 in one embodiment. As shown in FIG. 1, environment 100 may include a server 110, an event log 120, a network 130, and a client 140. Server 110 may be functionally coupled to event log 120 to control, maintain, and access data stored therein. Event log 120 may store data in the form of "events" which may be associated with a time reference (e.g., a common time reference defined as a "timeline") and other data such as information about a peripheral device and/or other metadata. An event can be an occurrence observed by a data collection system and may be characterized, for example, by a start time and an end time based on the timeline. Such events may be captured using a variety of peripheral devices, such as, for example, by imaging sensors which generate video data. Client 140 may provide an interface allowing a user to select specific events of interest. For example, client 140 may present a Graphical User Interface (GUI) allowing the user to specify an "interval of interest" over a graphic representing the timeline (e.g., defining a start time and an end time for the interval). Client 140 may send a request (e.g., over network 130) to server 110 to retrieve events, from event log 120, which are associated with the user-selected interval of interest.

Server 110 may generate a response providing information regarding the events back to client 140 over network 130. This responsive information may include time references so that client 140 may associate the events with the timeline. For example, the information provided by server 110 may permit client 140 to display, with reference to the timeline, the start time of each event that temporally overlaps the interval of interest (e.g., specified by the user). The response generated by server 110 may be structured in such a manner so that it may be exchanged quickly over network 130. Upon receiving the response from server 110, the client may efficiently process the received information and generate a timeline relating the events associated with the interval of interest.

Continuing with FIG. 1, server 110 may be any type of machine suitable for serving requests from one or more clients 140, processing data extracted from event log 120, producing the information requested by one or more the client(s) 140, and maintaining event log 120. Because event log 120 may be stored in a database, server 110 may use any type of database software, such as, for example, MySQL, Oracle Database, Microsoft SQL Server etc., for adding, updating, and/or deleting records from event log 120. Server 110 may perform exemplary processes described herein in software, which may use an Application Programming Interface (API) to efficiently retrieve event data and generate data structures that may be used to generate a timeline of the events. Moreover, the API may be designed for efficient SQL databases and commands. Server 110 may be any type of computer using any operating system, of which exemplary components are further illustrated in FIG. 7 and described below.

Event log 120 may store data representing events that can be collected by one or more peripheral devices, where the event can be associated with a time (e.g., a time interval) on the timeline. As described in more detail below, the peripheral devices may include a device that can collect video, audio, and/or image data, and/or monitor any state of a person, an area, and/or an object (e.g., medical devices, area motion sensors, door and/or window sensors, etc.) The peripheral devices may be part of a Distributed Physical Access Control (DPAC) system, which are illustrated in FIGS. 3 through 6 and described in more detail below. Moreover, event log 120 may also store metadata which can provide information about the associated peripheral device, and/or information that can characterize the data collected by the peripheral device.

For example, the metadata may include location information of the peripheral device (e.g., address, zip code, geographical location coordinates in a standard reference frame, etc.), the type of device that generated the event (camera name, serial number, etc.), the type of media connected with the event, and any description thereof, such as, for example video frames per second, resolution, format, audio, etc. Moreover, additional metadata may be stored that can characterize the contents of the data for an event. For example, metadata may include information resulting from object recognition and/or motion analysis in a video, facial recognition in an image, voice recognition in audio, etc. As noted above, the data representing the events may be stored as records in a database, such as an SQL database. Server 110 may include the actual storage device used for storing event log 120 (e.g., an internal hard disk, RAID array, etc.). Alternatively, the storage device may be separate but directly attached to server 110 (e.g., Direct Access Storage unit, RAID array, etc.), or the storage device may be accessible to server 110 over network 130 (e.g., a Network Access Storage unit).

Network 130 may include one or more circuit-switched networks and/or packet-switched networks. For example, network 130 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Client 140 may enable a user to interact with server 110 to identify events of interest, and request information from server 110 regarding the events of interest that are stored in event log 120. The information identifying the events of interest may be manually entered by the user at client 140, for example, using a GUI. In one embodiment, the GUI can present a timeline graphic where the user can indicate a section of time on the timeline corresponding to the interval of interest to identify events of interest. Server 110 may process the request, and client 140 may receive from server 110 data structured (e.g., compactly) to provide information regarding relevant events. Client 140 may graphically display the information regarding the relevant events using the GUI. For example, the start time of each relevant event may be displayed at the appropriate point on a graphic representing the timeline.

Client 140 may be any suitable device that may provide a GUI for interacting with the user, and have the appropriate capability for interfacing with server 110 over network 130. The client device 140 may include, for example, any type computational device, portable communication device (e.g., a mobile phone, a smart phone, a phablet, and/or another type of wireless device), a personal computer or workstation; a server device; a laptop, tablet, or another type of portable computer; and/or any type of device with communication capability.

Figures 2A, 2B:
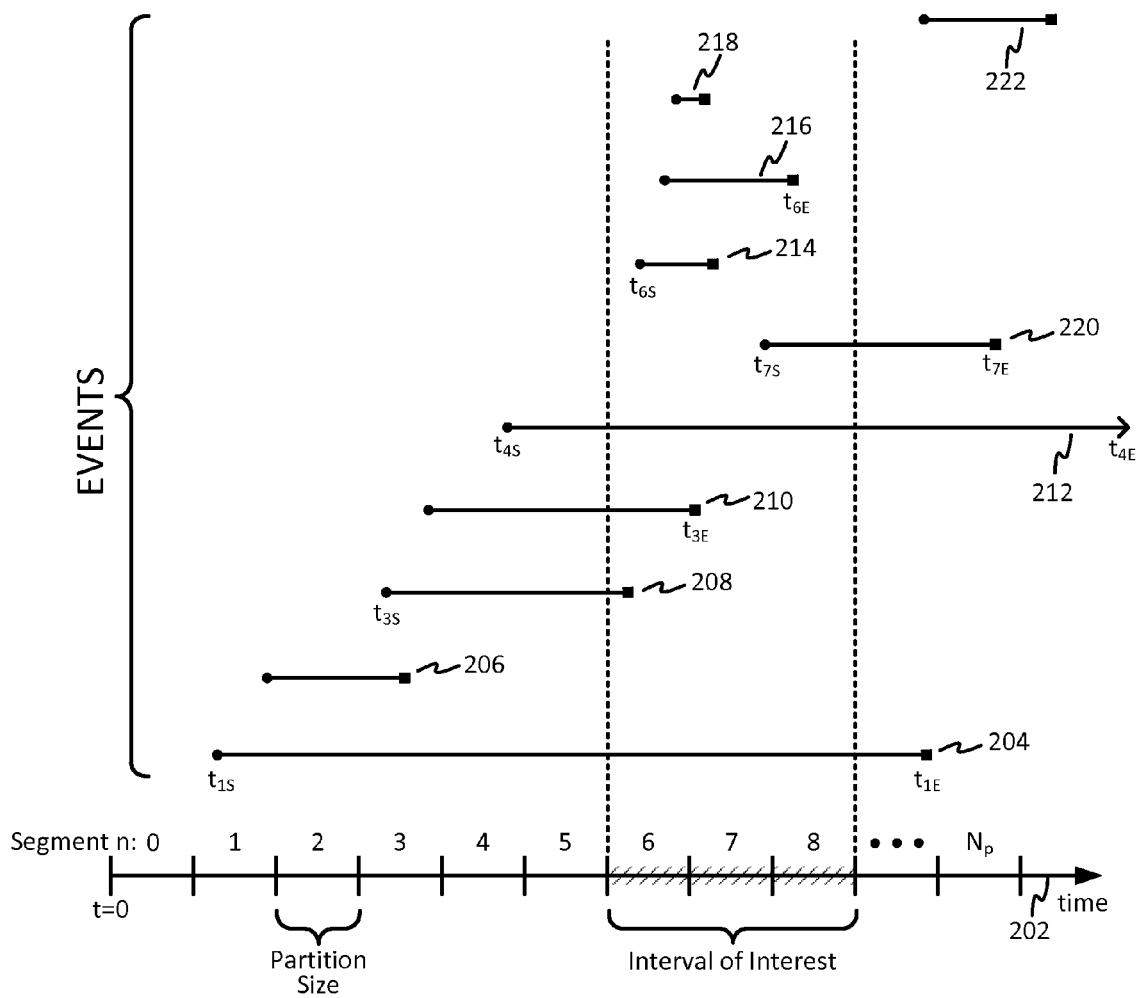
FIGS. 2A and 2B are illustrations depicting an exemplary approach for processing data associated with multiple events for efficient retrieval and timeline generation.

FIGS. 2A and 2B illustrate an embodiment for processing data associated with multiple events for efficient retrieval and timeline generation. FIG. 2A depicts an exemplary timeline 202 that may serve as a common time reference for the events. Timeline 202 may also serve as a useful mechanism for selecting events of interest, and for displaying results associated with relevant events. FIG. 2B is an exemplary data structure 230, which may be generated by server 110 to identify relevant events, and be used by client 140 for generating a timeline of the relevant events.

As shown in FIG. 2A, timeline 202 may start at time t=0 and continue for an arbitrary time period. Multiple events (204-222) are shown above timeline 202, where each event corresponds to data (e.g., collected by a peripheral device) associated with a period of time. For example, one or more events 204-222 could represent video data taken over a period of time aligning with the appropriate location on the timeline. Separate horizontal lines spanning the vertical dimension of the graph correspond to different events. Events represented by lines associated with a common time or time interval are at least partially concurrent, and may represent events generated by different peripheral devices, such as, for example multiple video cameras. Over a period of time, the number of events can become significant. For example, if timeline 202 extends approximately one week, over 100,000 events can be recorded in event log 120 in an a physical access control system.

Timeline 202 may be divided into $N_p$ segments based on a partition size. In one embodiment, the partition size may be specified as an input parameter by client 140. As such, the user's input may be received by client 140. Client 140 may also specify on timeline 202 a time period called an "interval of interest." The interval of interest may be specified by a user based on a start time and an end time. If client 140 uses a GUI, then the interval may be represented graphically by the user. Events that overlap with at least a portion of the interval of interest are referred to as "events of interest." For example, referring to FIG. 2A, events having at least a partial overlap with timeline 202, as shown between the vertical dotted lines, are events of interest. Thus events 204 and 208 through 220 are classified as events of interest. Events 206 and 222, having lines outside the time boundaries established by the vertical dotted lines, are not classified as events of interest.

In order to identify relevant events for generating an event timeline per the user's request, server 110 may perform the following process. The server may, for each segment over all the segments in the timeline ($n=1:N_p$), determine if one or more events of interest start in segment n. Upon determining that one or more events of interest start within segment n, those events are identified as "relevant events." In other words, a relevant event for a given segment is an event which starts within that segment, and overlaps with the interval of interest. Upon identifying the relevant events in segment n, the following parameters may be determined for segment n: the earliest start time ($t_{nS}$) of the events starting in segment n, the latest end time ($t_{nE}$) of the events starting in segment n, and the number of relevant events (defined as the count) for segment n. For each segment n having a non-zero count, the parameters $t_{nS}$, $t_{nE}$, and the count may be provided to client 140. This information may be determined on a per-segment basis for all of the segments $N_p$, and provided to client 140 by server 110 in a data structure, such as, for example, table 230 shown in FIG. 2B.

Further referring to FIGS. 2A and 2B, the following description illustrates an example of how table 230 may be generated. Referring to timeline 202, segment n=0 would be evaluated as not having any relevant segments starting therein, and thus information associated with this segment would not be recorded in table 230. The process would proceed to segment n=1, which is the first segment having a relevant event starting therein (i.e., the event of interest 204). Accordingly, the process may generate a first row 231 in table 230, including the index n=1 to identify the first segment, along with the first start time $t_{1S}$, the last end time $t_{1E}$, and the number of relevant events (count=1), all of which are associated with event 204. Note that for segment n=1, event 206 cannot count as a relevant event as it does not overlap the interval of interest, thus it is not included in table 230.

In this example, the process would skip segment n=2 because there is no relevant event associated therewith, and proceed to segment n=3. Segment n=3 has two relevant events starting therein, events 208 and 210. Accordingly, the process may generate a second row 232 in table 230, including the index n=3 to identify the third segment, along with the first start time $t_{3S}$ associated event 208, the last end time $t_{3E}$ associated with event 210. There are two events starting in segment n=3 (reflecting events 208 and 210).

The process would proceed to segment n=4 which has relevant event 212 starting therein. Accordingly, the process may generate a third row 233 in table 230, including the index n=4 to identify the fourth segment, along with the first start time $t_{4S}$ and the last end time $t_{4E}$, which are both associated with event 212. The number of relevant events starting in segment n=4 is one (reflecting event 212).

The process would skip segment n=5 because there is no relevant event associated therewith, and proceed to segment n=6. Segment n=6 has three relevant events starting therein, events 214, 216 and 218. Here, the process may generate a fourth row 234 in table 230, including the index n=6 to identify the sixth segment, along with the first start time $t_{6S}$ associated with event 214 and the last end time $t_{6E}$ associated with event 216. The count is three in this instance, since relevant events 214, 216, and 218 start in segment n=6.

The process would proceed to segment n=7 which has relevant event 220 starting therein. Here, the process may generate a fifth row 235 in table 230, including the index n=7 to identify the seventh segment, along with the first start time $t_{7S}$, the last end time $t_{7E}$, and a count=1, all being associated with event 220. Segments n=8:$N_p$ do not have any relevant events starting therein, so the table 230 is complete with rows 231 through 235.

Once server 110 completes analysis of all the segments in timeline 202 and table 230 is complete, the table 230 may be provided to client 140. Client 140 can readily use the information in table 230 to show the starting time of the relevant events on a timeline, which may be displayed on a GUI. The client may also show information relating to the count associated with each segment listed in table 230. Note that table 230 condenses the information regarding the relevant events by effectively performing a "lossy compression" of the information. In this example, while table 230 is compact for efficient transmission over network 130, the individual relevant events cannot be reconstructed from table 230, as the start time $t_{nS}$ and end time $t_{nE}$ only provide bounds for all of the relevant events starting in each segment n listed in table 230.

Figure 3:
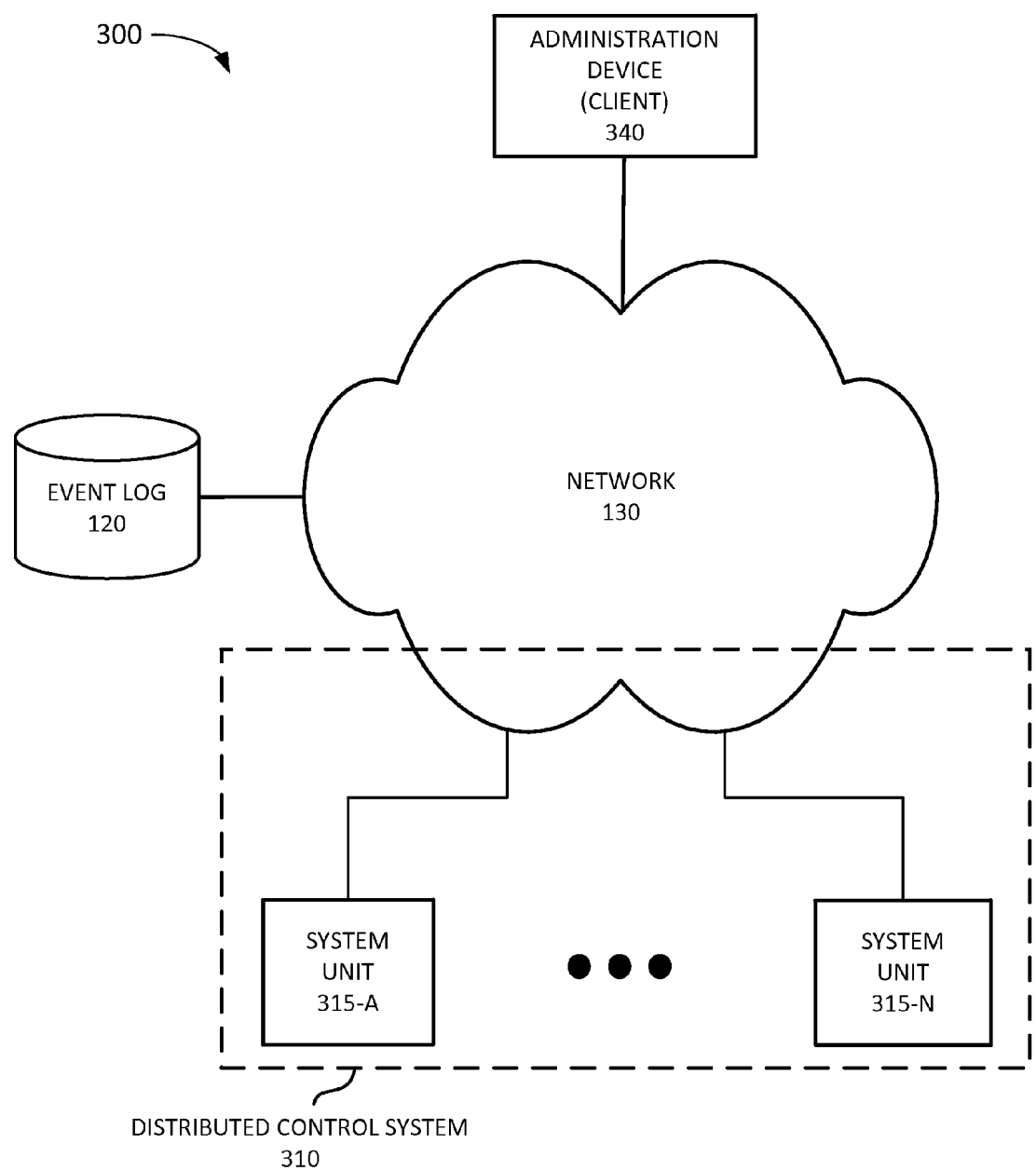
FIG. 3 is a block diagram illustrating an exemplary environment of a distributed physical access system which may perform efficient retrieval of events for event timeline generation.

FIG. 3 is a block diagram illustrating an exemplary environment 300 of a distributed physical access system which may perform efficient retrieval of events for event timeline generation. As shown in FIG. 3, environment 300 may include a distributed control system 310 (e.g., a distributed physical access control system or DPACS), network 130, an administration device 340, and event log 120.

Control system 310 may include a distributed computing system that includes system units 315-A to 315-N (referred to collectively as "system units 315" and individually as "system unit 315" or "unit 315"). System unit 315 may include a physical access control device. For example, unit 315 may include an access controller that controls access to a secure area, such as a room or a group of rooms. System unit 315 may receive credentials (e.g., access card credentials) via a reader device; determine whether the credentials are authentic; and determine whether a user/device represented by the credentials has the authority to access the secure area. If so, the access controller may issue a command to open a lock on a door or perform other operations associated with granting access to the secure area.

Control system 310 may include one or more distributed datasets. A distributed dataset includes data that is stored in a distributed and potentially redundant fashion in units 315. In one embodiment, distributed datasets are replicated on more than one device. For example, the entire distributed dataset may be stored in all the units 315. In another embodiment, one or more units 315 may store a subset of the distributed dataset. Also, a distributed dataset may be associated with all system units 315 or may be associated with a subset of system units 315.

In one embodiment, consensus is reached among units 315 in order for a change to be made in the distributed dataset (e.g., a consensus-based distributed database). System unit 315 may propose a change to a consensus-based distributed dataset. If the change is accepted by a quorum of units 315 associated with the distributed dataset, a consensus may be reached and the change may be propagated to each local copy of the distributed dataset in each associated unit 315. Thus, a consensus with respect to a change in the distributed dataset may be reached if a quorum of the associated units 315 votes for the change. A quorum may correspond to the smallest majority of the associated units 315. Thus, if a distributed dataset is associated with N units 315, a quorum may be reached if N/2+1 associated units 315 votes for the change if N is an even number, or if (N−1)/2+1 associated units 315 votes for the change if N is an odd number. Requiring a smallest majority to reach a quorum may ensure that when considering two conflicting proposals, at least one system unit 315 receives both proposals and selects one of the proposals for consensus.

A consensus-based distributed dataset may ensure that any system unit 315 associated with the distributed dataset includes the information (e.g., all the information in one embodiment) managed by the distributed dataset. For example, a distributed dataset may include access rules and the access rules may be available to any system unit 315 associated with the distributed dataset. Thus, as a result of the one or more distributed datasets, in one embodiment, control system 310 may correspond to a decentralized system with no central controlling device, such as a server device. In other embodiments, control system 310 may include both a decentralized system and a central controlling device (such as a server device). Changes to control system 310 may be configured at any system unit 315 and if the change is associated with a distributed dataset, the change may be propagated to other system units 315 associated with the distributed dataset. Furthermore, control system 310 may exhibit robustness with respect to device failure, as a single point of failure may be avoided. For example, if a particular system unit 315 fails, the other units 315 may continue to operate without loss of data (or with the minimization of loss of data). In another embodiment, a change may be made to the distributed dataset without consensus.

In one embodiment, one or more unit 315 may generate event data and provide the event data to event log 120 over network 130. This may be performed in a decentralized manner, coordinated by the consensus-based approach described above. Additionally, control system 310 may run software to maintain and access event log 120. The software may include database software specifically designed to run in a control system 310 environment. In other embodiments, control system 310 may include both a decentralized system and a central controlling device, such as server 110 described above (not shown in FIG. 3). In this embodiment, the server may interact with event log 120 as provided above in the description of FIG. 1.

Network 130 may enable units 315 to communicate with each other, with event log 120, and/or may enable administration device 340 to communicate with particular units 315.

Administration device 340 may enable an administrator to connect to a particular unit 315 in order to configure control system 310, change a configuration of control system 310, receive information from control system 310, and/or otherwise administer control system 310. Administration device 340 may include any device configured for communicating with a unit 315. For example, administration device 340 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

In one embodiment, administration device 340 may also perform the functionality of the client 110 as described above with reference to FIG. 1, and permit the user to specify the interval of interest and/or the partition size of a timeline. Additionally, administration device 340 may interact with one or more units 315 and/or a server 110 (not shown in FIG. 3) to receive information regarding relevant events for generating a timeline. In alternative embodiments, a separate client device 140 (not shown in FIG. 3) may be provided to interact with the units 315 and/or a separate server 110.

Although FIG. 3 shows exemplary components of environment 300, in other implementations, environment 300 may include fewer components, different components, differently arranged components, or additional components than those depicted in FIG. 3. Additionally or alternatively, any one device in environment 300 (or any group of devices) may perform functions described as performed by one or more other devices in environment 300. Further, although exemplary distributed control system 310 may include a physical access distributed control system, other implementations may control systems other than physical access. On the other hand, distributed control system 310 may include any type of physical access control systems (e.g., in an operational environment), such as a control system for opening and/or closing a door or controlling physical access to a building or facility. Distributed control system 110 may also include a system to control a fan (e.g., start or stop), to initiate an alarm in a building management system (e.g., failed authentication, successful authentication, etc.), or to control a robot arm in an industrial automation system.

Figure 4:
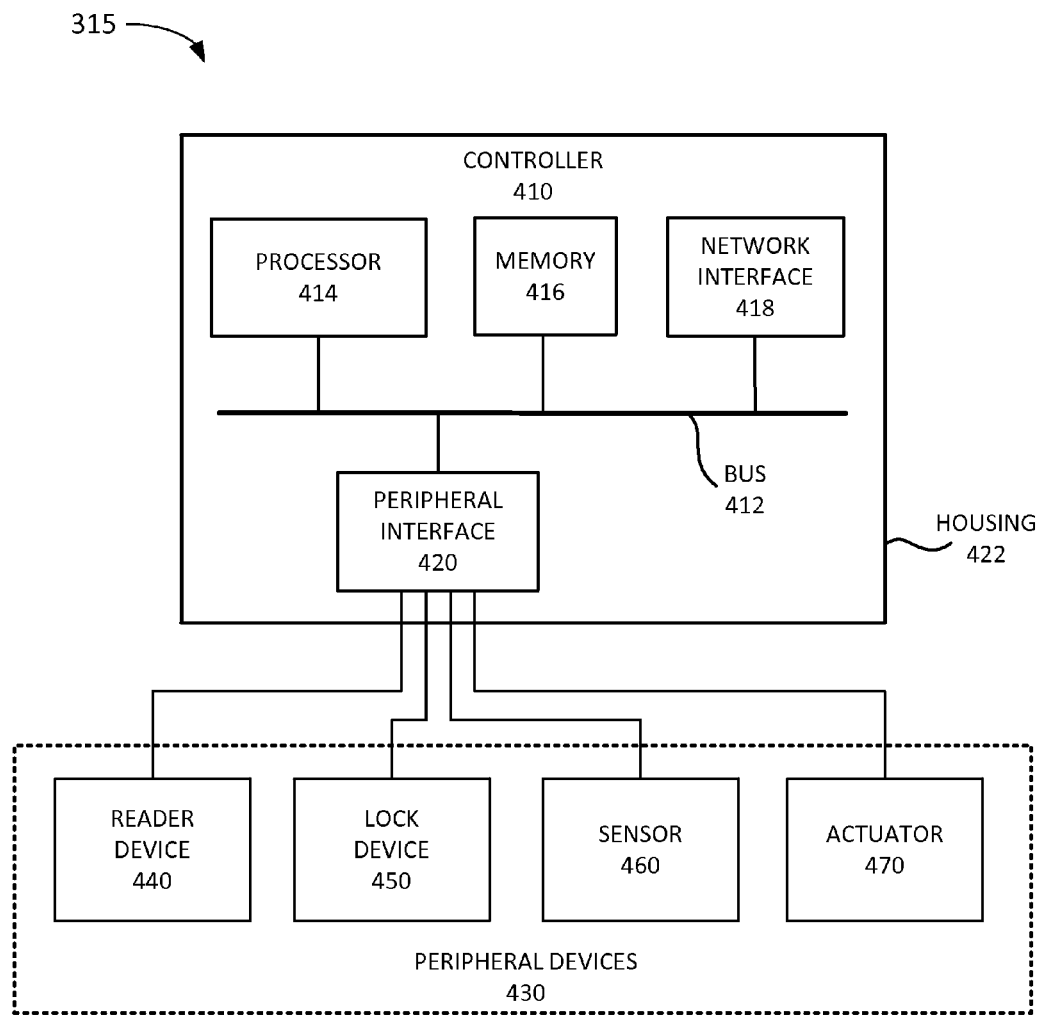
FIG. 4 is a block diagram illustrating exemplary components of a distributed physical access system unit of FIG. 3.

FIG. 4 is a block diagram illustrating exemplary components of a unit 315. As shown in FIG. 3, unit 315 may include a controller 410 and one or more peripheral devices 430. Controller 410 may control the operation of unit 315, may communicate with other units 315, may communicate with administration device 340, and/or may control peripheral devices 430. Controller 410 may include a bus 412, a processor 414, a memory 416, a network interface 418, a peripheral interface 420, and a housing 422.

Bus 412 includes a path that permits communication among the components of controller 410. Processor 414 may include any type of single-core processor, multi-core processor, microprocessor, latch-based processor, and/or processing logic (or families of processors, microprocessors, and/or processing logics) that interprets and executes instructions. In other embodiments, processor 414 may include an application-specific integrated circuit (ASIC), a field-programmable gate array (FPGA), and/or another type of integrated circuit or processing logic.

Memory 416 may include any type of dynamic storage device that may store information and/or instructions, for execution by processor 414, and/or any type of non-volatile storage device that may store information for use by processor 414. For example, memory 416 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 418 may include a transceiver (e.g., a transmitter and/or a receiver) that enables controller 410 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radio frequency (RF), infrared, and/or visual optics, etc.), or a combination of wireless and wired communication links. Network interface 418 may include a transmitter that converts baseband signals to RF signals and/or a receiver that converts RF signals to baseband signals. Network interface 418 may be coupled to an antenna for transmitting and receiving RF signals.

Network interface 418 may include a logical component that includes input and/or output ports, input and/or output systems, and/or other input and output components that facilitate the transmission of data to other devices. For example, network interface 418 may include a network interface card (e.g., Ethernet card) for wired communications and/or a wireless network interface (e.g., a WiFi) card for wireless communications. Network interface 418 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Peripheral interface 420 may be configured to communicate with one or more peripheral devices 430. For example, peripheral interface 420 may include one or more logical components that include input and/or output ports, input and/or output systems, and/or other input and output components that facilitate the transmission of data to peripheral devices 430. As an example, peripheral interface 420 may communicate with peripheral devices using a Serial Peripheral Interface Bus protocol. As another example, peripheral interface 420 may use a different type of protocol. Housing 422 may enclose the components of controller 410 and may protect the components of controller 410 from the environment.

As described below, controller 410 may perform certain operations relating to performing efficient retrieval of events for event timeline generation, and/or perform operations to maintain event log 120, which may include using a database specifically designed to run on the controller 410. Controller 410 may perform these operations as a result of hardwired circuitry of an ASIC. Controller 410 may also (or alternatively) perform these operations in response to processor 414 executing software instructions contained in a computer-readable medium, such as memory 416. A computer-readable medium may be defined as a non-transitory memory device. A memory device may be implemented within a single physical memory device or spread across multiple physical memory devices. The software instructions may be read into memory 416 from another computer-readable medium or from another device. The software instructions contained in memory 416 may cause processor 414 to perform processes described herein. Thus, implementations described herein are not limited to any specific combination of hardware circuitry and software.

Peripheral devices 430 may include one or more devices that provide information to controller 410, that are controlled by controller 410, and/or that otherwise communicate with controller 410. In one embodiment, peripheral devices 430 may include any type of security device. For example, peripheral devices 430 may include security devices such as a reader device 440, a lock device 450, a sensor 460, and/or an actuator 470. A peripheral device may include any type security device that can provide credentials, and may further include combinations of the types of peripheral devices listed above. For example, a reader can be any type of device providing credentials, and may use one or more sensors, such as, a camera and/or microphone, to accomplish its task. While a single reader device 440, a single lock device 450, a single sensor 460, and a single actuator 470 are shown in FIG. 4 for illustrative purposes, in practice, peripheral devices 430 may include multiple reader devices 440, multiple lock devices 450, multiple sensors 460, and/or multiple actuators 470. In some embodiments, peripheral devices 430 may also not include one or more of the devices shown in FIG. 4. Moreover, the peripheral devices 430 may include any type monitoring device which can produce a sequence of data associated with time, and thus provide data associated with the events stored in event log 120.

Reader device 440 may include a device that reads credentials from a user and provides the credentials to controller 410. For example, reader device 440 may include a keypad configured to receive an alphanumeric personal identification number (PIN) from a user; a card reader to configure a card that stores a card code on a magnetic strip or another type of storage device, such as an RFID tag; a fingerprint reader configured to read a user's fingerprint; an iris reader configured to read a user's iris; a microphone and a voice signature identifier configured to record a user's voice signature; and/or another type of reader device. Reader device 440 may also include any type security device that can provide credentials, and may include one or more sensor devices, such any sensor device described with reference to sensor 460. For example, reader device 440 may include a camera used for facial recognition and/or a microphone used for voice recognition. In these cases, a user's voice or face may be used as a user's credential.

Lock device 450 may include a lock controlled by controller 410. Lock device 450 may lock a door (e.g., prevent it from opening or closing), a window, an HVAC vent, and/or another type of access opening to a secure area. For example, lock device 450 may include an electromagnetic lock; a mechanical lock with a motor controlled by controller 410; an electromechanical lock; and/or another type of lock.

Sensor 460 may include any type of sensor device. As examples, sensor 460 may include a door sensor to sense whether a door is open or closed; a window sensor to sense whether a window is open or closed; a proximity sensor, a visible light monitoring device, an infrared (IR) light monitoring device, a heat signature monitoring device, and/or another type of monitoring device; an alarm sensor, such as a motion sensor, a heat sensor, a pressure sensor, and/or another type of alarm sensor; a tamper sensor, such as a position sensor located inside unit 315; a touch sensor (e.g., a "request to exit" button located within a secure area associated with unit 315); and/or another type of sensor device. Sensor 460 may further include any type of sensor which collects image data, video data, or a combination thereof, along with time data. The collected data may be either recorded in a format consistent with the timeline, or may be further processed so as to be consistent with the timeline (e.g. compensate for time offsets or clock drifts in sensor 460).

Actuator 470 may include an actuator device. As an example, actuator 470 may control an illumination device. As other examples, actuator 470 may include a burglar alarm activator; a speaker to play messages or generate alarm signals; a display device; a motor to move sensor 460 (e.g., control the field of view of a camera or other monitoring device); a motor for opening/closing a door, window, HVAC vent, and/or another opening associated with a secure area; a motor to secure lock device 450 in a locked or unlocked position; a fire extinguishing device; and/or another type of actuator device.

Although FIG. 4 shows exemplary components of unit 315, in other implementations, unit 315 may include fewer components, different components, additional components, or differently arranged components than those depicted in FIG. 4. Additionally or alternatively, any component of unit 315 (or any group of components) may be combined with one or more other components of unit 315. Conversely, the functionalities of a component of unit 315 may be distributed over one or more components.

Figure 5:
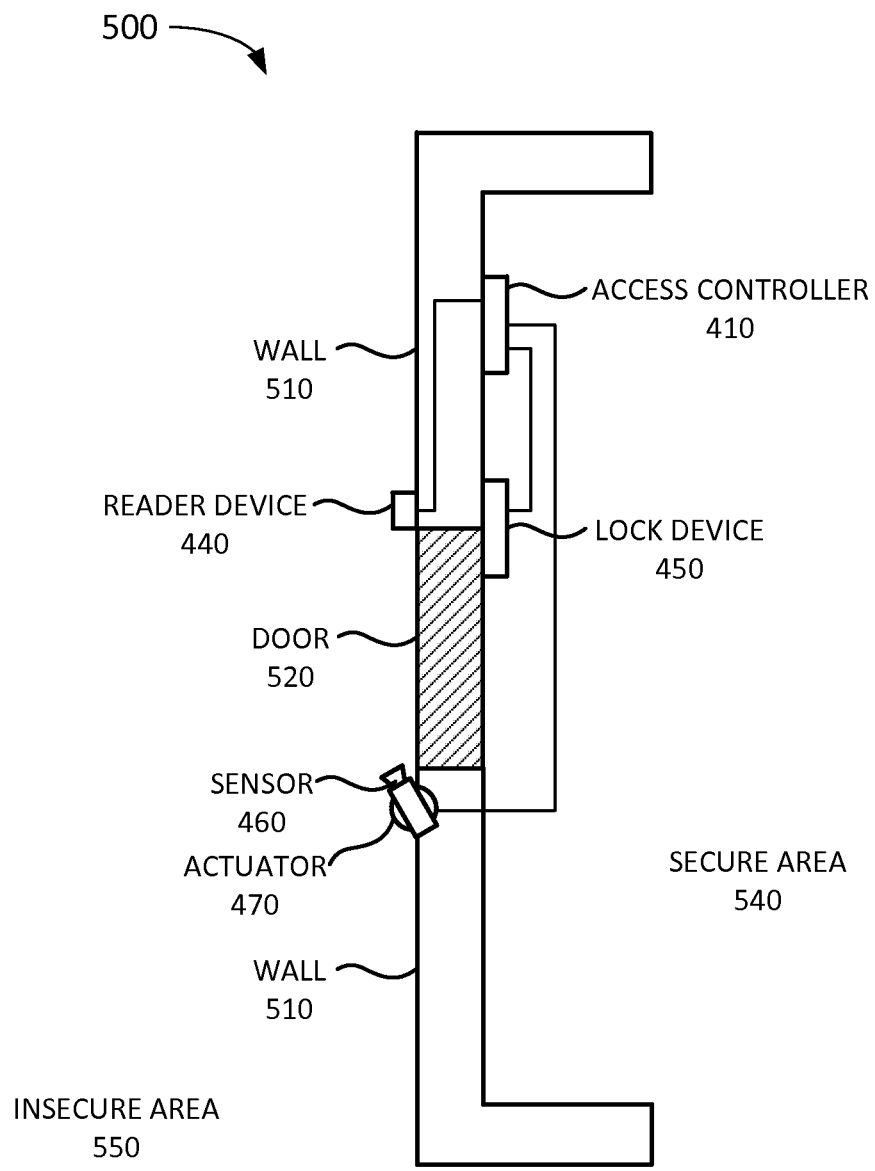
FIG. 5 is a floor plan diagram illustrating an exemplary physical layout of the distributed physical access system unit of FIG. 3.

FIG. 5 is a floor plan diagram illustrating an exemplary physical layout 500 of unit 315. As shown in FIG. 5, physical layout 500 may include a wall 510, a door 520, controller 410, reader device 440, lock device 450, sensor 460, and actuator 470.

Wall 510 encloses a secure area 540, such as a room in a building. Door 520 provides a user with access to secure area 540. In this embodiment, controller 410 is installed inside secure area 540. In other embodiments, controller 410 may be installed in an insecure area 550. Reader device 440 is installed outside secure area 540 and lock device 450 is installed inside secure area 540 to wall 510 and door 520. Sensor 460, in this example, is a monitoring device mounted outside secure area 540 in insecure area 550. Actuator 470 includes a motor used to control the field of view of the monitoring device 460 in this example.

When a user enters credentials into reader device 440 (e.g., by entering a PIN, scanning an access card, scanning an iris, etc.), controller 410 may use the credentials to authenticate the identity of the user and may perform a lookup in an access rules table to determine whether to grant access to the user based on the identity of the user and the access rules. If controller 410 determines that access should be granted, controller 410 activates lock device 450 to unlock door 520, thus granting access to the user to secure area 540.

Although FIG. 5 shows exemplary components of physical layout 500, in other implementations, physical layout 500 may include fewer components, different components, additional components, or differently arranged components than depicted in FIG. 5. Additionally or alternatively, any one component (or group of components) in physical layout 500 may perform a task or tasks described as performed by one or more other components of physical layout 500.

Figure 6:
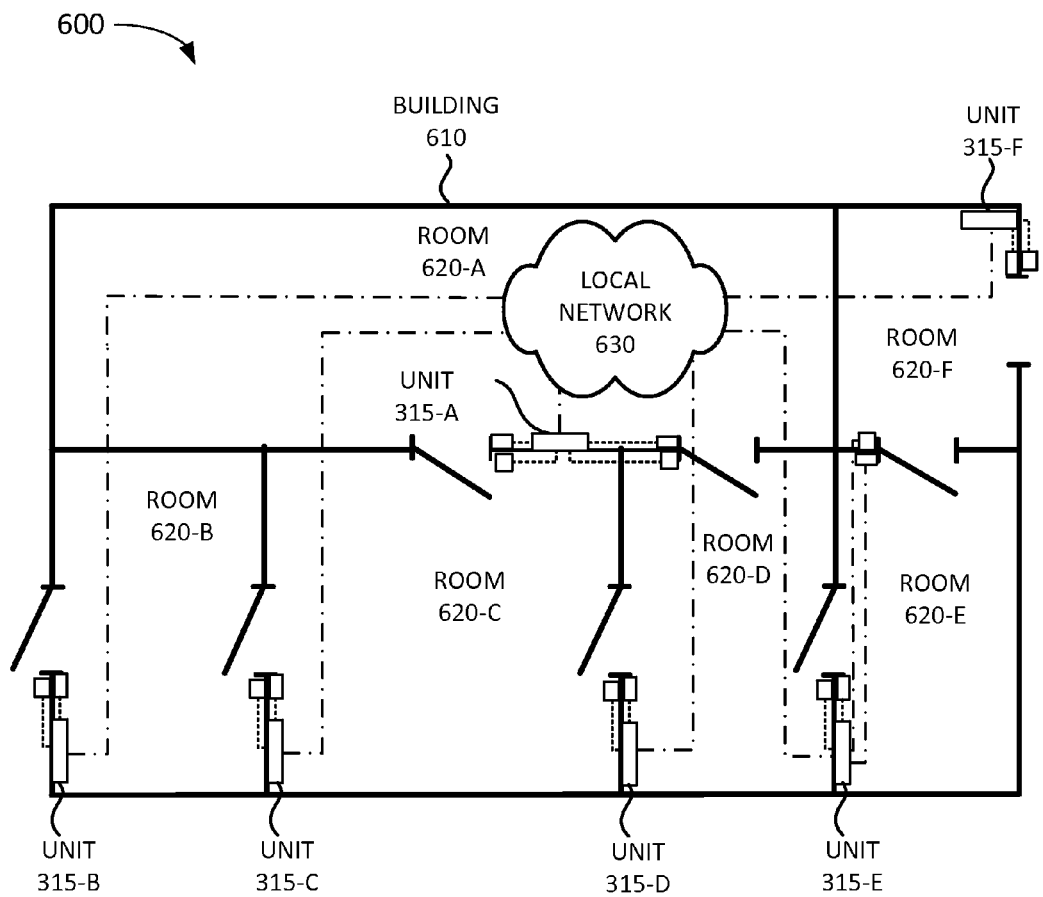
FIG. 6 is a floor plan diagram illustrating an exemplary physical layout of the distributed physical access system of FIG. 3.

FIG. 6 is a floor plan diagram illustrating an exemplary physical layout 600 of control system 310. As shown in FIG. 6, physical layout 600 may include a building 610 with rooms 620-A through 620-F. A local network 630, such as an Ethernet network, may interconnect units 315-A through 315-F. In this example, unit 315-A controls two doors into room 620-A; unit 315-B controls an outside door into room 620-B; unit 315-C controls one door from room 620-B to room 620-C, unit 315-D controls one door from room 620-C to room 620-D; unit 315-E controls one door from room 620-D to room 620-E; and unit 315-F controls an outside door into room 620-F.

In this example, units 315-A to 315-F do not include a central controlling device (e.g., a server) and may include one or more distributed datasets. For example, units 315-A through 315-F may maintain a distributed credentials table, a distributed access rules table, and/or a distributed events log. Assume an administrator uses administration device 340 to log into unit 315-A to add a user and to add credentials associated with a user. The added credentials may be distributed to the other units 315 that control doors to rooms to which the user has access. If unit 315-B fails, for example, data collected by unit 315-B may continue to be available as a result of a distributed events log included in the other DPACS units.

Although FIG. 6 shows exemplary components of physical layout 600, in other implementations, physical layout 600 may include fewer components, different components, additional components, or differently arranged components than depicted in FIG. 6. For example, in another embodiment, a central controlling device (e.g., a server 110) may be used in conjunction with one or more distributed datasets. Additionally or alternatively, one or more components of physical layout 600 may perform one or more tasks described as performed by one or more other components of physical layout 600.

Figure 7:
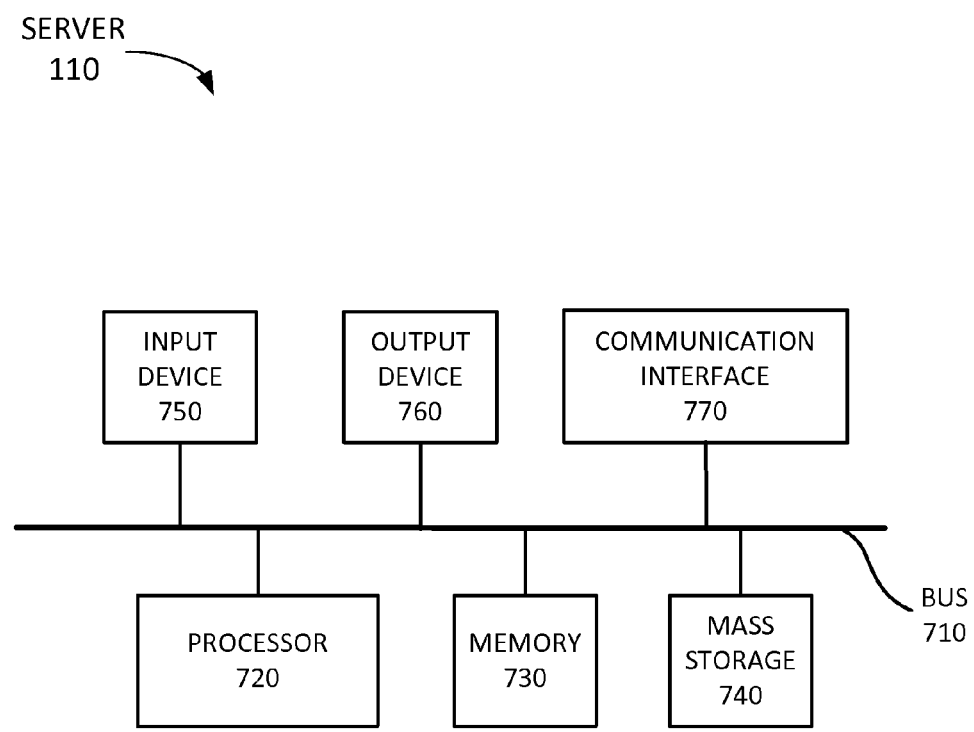
FIG. 7 is a block diagram illustrating exemplary components of the server of FIG. 1.

FIG. 7 is a block diagram illustrating exemplary components of server 110. As shown in FIG. 7, server 110 may include a bus 710, a processor 720, a memory 730, mass storage 740, an input device 750, an output device 760, and a communication interface 770.

Bus 710 includes a path that permits communication among the components of server 110. Processor 720 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic. For example, the processor 705 may be an x86 based CPU, and may use any operating system, which may include varieties of the Windows, UNIX, and/or Linux. The processor 720 may also use high-level analysis software packages and/or custom software written in any programming and/or scripting languages. For example, server 110 may use any type of database software, such as, for example, MySQL, Oracle Database, Microsoft SQL Server etc., for adding, updating, and/or deleting records from event log 120.

Memory 730 may include any type of dynamic storage device that may store information and/or instructions, for execution by processor 720, and/or any type of non-volatile storage device that may store information for use by processor 720. For example, memory 730 may include a RAM or another type of dynamic storage device, a ROM device or another type of static storage device, a CAM, a magnetic and/or optical recording memory device and its corresponding drive (e.g., a hard disk drive, optical drive, etc.), and/or a removable form of memory, such as a flash memory. Mass storage device 740 may include any type of on-board device suitable for storing large amounts of data, and may include one or more hard drives, solid state drives, and/or various types of RAID arrays. Mass storage device 740 would be suitable for storing files associated with event log 120, which may include any type of database file.

Input device 750, which may be optional, can allow an operator to input information into administration sever 110, if required. Input device 750 may include, for example, a keyboard, a mouse, a pen, a microphone, a remote control, an audio capture device, an image and/or video capture device, a touch-screen display, and/or another type of input device. In some embodiments, server 110 may be managed remotely and may not include input device 750.

Output device 760 may output information to an operator of server 110. Output device 760 may include a display, a printer, a speaker, and/or another type of output device. For example, server 110 may include a display, which may include a liquid-crystal display (LCD). In some embodiments, server 110 may be managed remotely and may not include output device 760.

Communication interface 770 may include a transceiver that enables server 110 to communicate over network 130 with other devices and/or systems. The communications interface 770 may be a wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 770 may include a transmitter that converts baseband signals to RF signals and/or a receiver that converts RF signals to baseband signals. Communication interface 770 may be coupled to an antenna for transmitting and receiving RF signals.

Communication interface 770 may include a logical component that includes input and/or output ports, input and/or output systems, and/or other input and output components that facilitate the transmission/reception of data to/from other devices. For example, communication interface 760 may include a network interface card (e.g., Ethernet card) for wired communications and/or a wireless network interface (e.g., a WiFi) card for wireless communications. Communication interface 770 may also include a USB port for communications over a cable, a Bluetooth™ wireless interface, an RFID interface, an NFC wireless interface, and/or any other type of interface that converts data from one form to another form.

As described below, server 110 may perform certain operations relating to efficient retrieval of events for timeline generation. Server 110 may perform these operations in response to processor 720 executing software instructions contained in a computer-readable medium, such as memory 730 and/or mass storage 740. The software instructions may be read into memory 730 from another computer-readable medium or from another device. The software instructions contained in memory 730 may cause processor 720 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 7 shows exemplary components of server 110, in other implementations, server 110 may include fewer components, different components, additional components, or differently arranged components than depicted in FIG. 7. Additionally or alternatively, one or more components of server 110 may perform one or more tasks described as performed by one or more other components of server 110.

Figure 8:
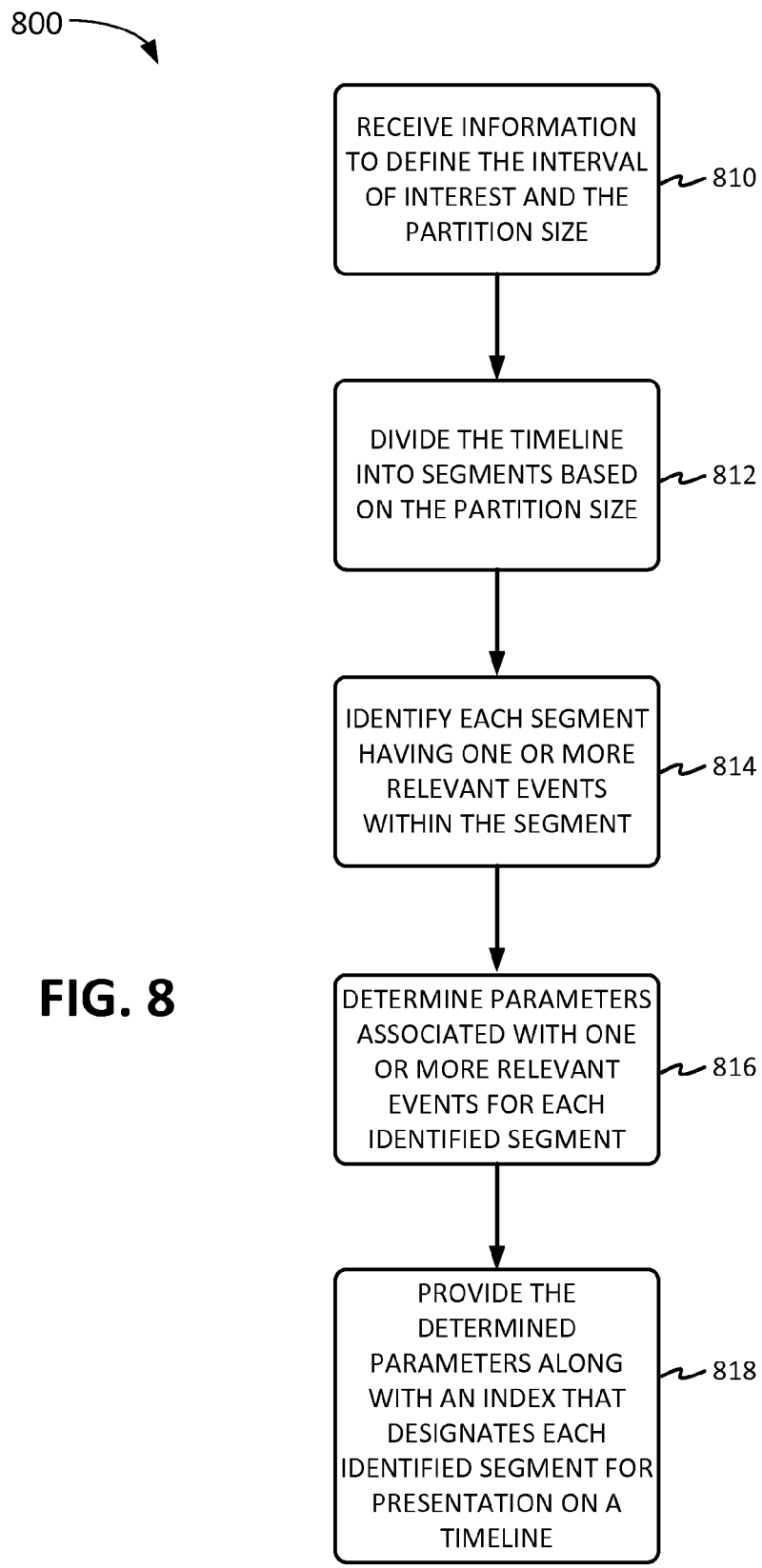
FIG. 8 is a flowchart illustrating an exemplary process for efficient retrieval of event data.

FIG. 8 is a flowchart illustrating an exemplary process 800 for efficient retrieval of event data. The process 800 may execute on server 110, or in other embodiments, on one or more system units 315.

The process 800 includes initially receiving information to define the interval of interest and the partition size (block 810). The received information may have been sent from client 140. The received information may be provided with respect to a timeline, and may include receiving a start time and an end time to define the interval of interest. The received information may have been provided by a user through a GUI, where the received start time, end time, and partition size have been defined graphically at client 140. In alternative embodiments, the information may further include metadata which can be used to filter events. Such metadata my include position information (e.g., GPS coordinates, addresses, etc.), the type of peripheral device 430 which generated the data associated with the event (e.g., camera type, manufacturer, serial number, etc.), the media type that is associated with the event (e.g., video, image, etc.), and metadata associated with the media (e.g., frames per second, compression type, format, audio, etc.).

Process 800 also includes dividing timeline 202 into segments based on the partition size (block 812). The partition size may be specified by the user via a graphical user interface at client 140.

Process 800 also includes identifying each segment having one or more relevant events within the segment (block 814). A relevant event may be an event which starts within a segment and overlaps with the interval of interest. The identification in block 814 may further be refined by filtering based on the metadata described above.

For example, in an embodiment, server 110 classifies events based on peripheral device(s) 430 associated with the events (e.g., the events are observed at different devices), and filters relevant events based on the classification. Alternatively, the server may classify events based on information determined from collected data, and filter relevant events based on the classification. In an embodiment, peripheral devices 430 may include one or more video cameras for collecting video data associated with the events. The collected data may describe, for example, motion of objects in the image (e.g., entering or leaving a room), identify recognized objects within an image or video, characterize audio, etc.

In another embodiment server 110 identifies events in block 814 using two SQL queries. Server 110 performs a first SQL query on event log 120 to determine events which overlap in time with the interval of interest to identify events of interest. Server 110 then performs a second SQL query on the event log for each segment to ascertain whether any events of interest start in the queried segment. If so, server 110 classifies the ascertained events as relevant events for the queried segment. Server 110 then determines parameters associated with one or more relevant events for each identified segment (block 816), and then provides the determined parameters along with an index which designates each identified segment for presentation on a timeline (block 818). The parameters may be provided to client 140 for generation of a timeline, as discussed in FIG. 9 below.

Figure 9:
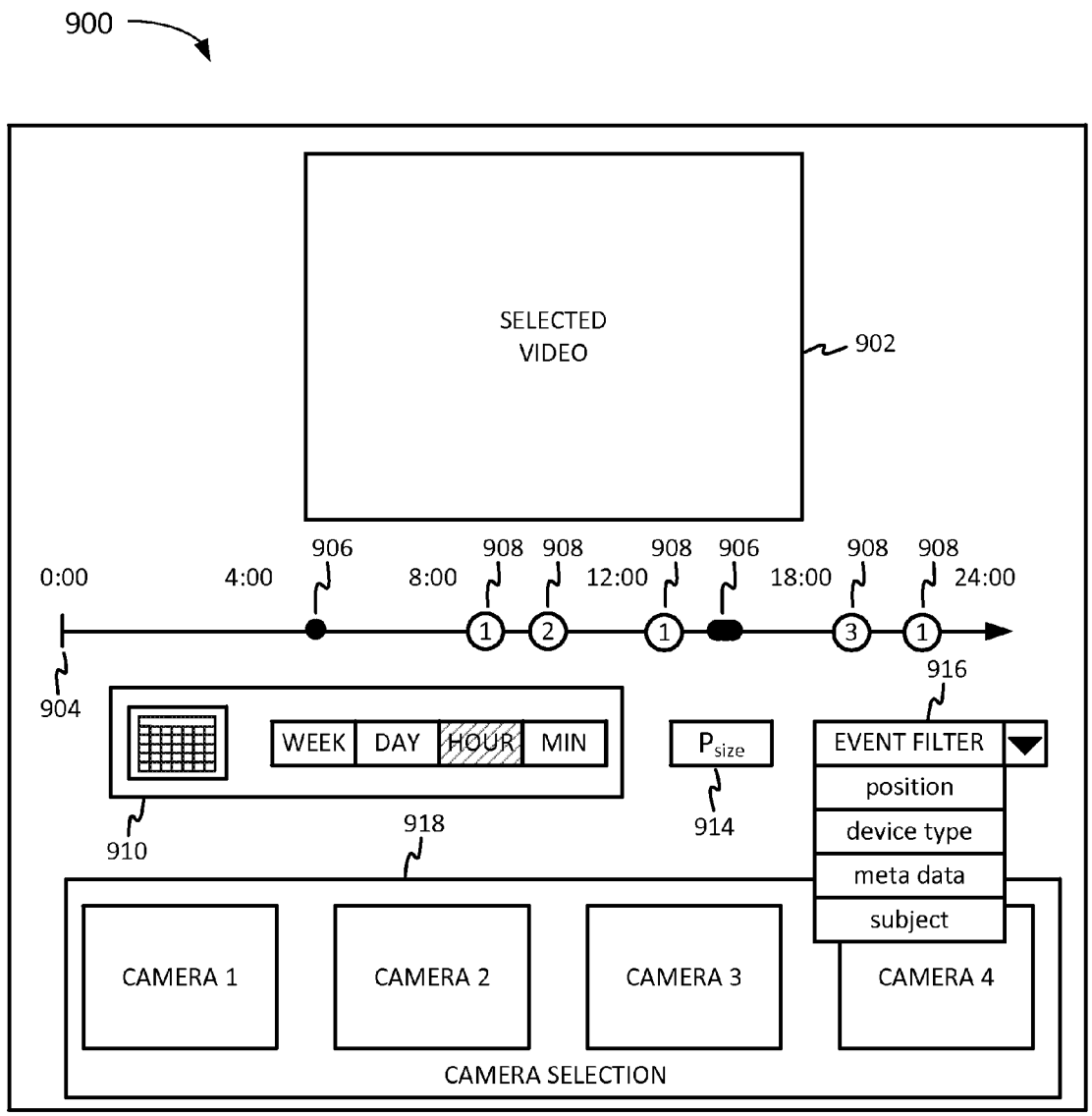
FIG. 9 is a diagram illustrating an exemplary graphical user interface which may utilize a timeline to specify events of interest and display relevant events.

FIG. 9 is a diagram illustrating an exemplary graphical user interface (GUI) 900 where peripheral devices 430 include four video cameras. In one embodiment, client 140 generates and displays GUI 900 to provide information to the user. Client 140 also creates graphical controls to permit the user to enter a variety inputs. GUI 900 may include a main video window 902, a timeline graphic 904, time entry controls 910, a partition size entry control, and camera selection control 918.

The user may specify the dates when the data was collected, and/or adjust the scale of timeline graphic 904 using time entry controls 910. For example, a specific date may be entered using a calendar-style widget illustrated to the left. The scale of timeline graphic 904 may be specified using different button controls. As shown in FIG. 9, the "HOUR" button is selected, and thus timeline graphic 904 is presented in units of hours, which are labeled in four hour increments above timeline graphic 904.

In an embodiment, client 140 allows the user to select specific events of interest using the timeline graphic 904 by graphically selecting one or more an intervals of interest, based on one or more graphic input indicators 906. The location of graphic input indicators 906 on timeline graphic 904 indicates the time at which the interval of interest occurred, and the size and/or shape of graphic input indicators 906 may indicate the duration of the interval of interest. The client 140 may accept the pixel locations and/or extents and convert these to time values based on the scale of timeline graphic 904, and then provide these values to server 110, for example, as start and end times for each interval of interest. Additionally, the user may also specify the partition size based on input control 914, to specify how finely the timeline 202 will be segmented for processing by server 110. In addition to specifying the intervals of interest, the user may further filter events using an event filter control 916, which may specify additional criteria and/or metadata (as mentioned above) to specify events of interest using parameters besides time. For example, events may be further filtered based on position, device type, metadata, subject, etc.

Once client 140 receives one or more of the aforementioned user inputs, it may then provide the user input information to server 110 in the form of a request. Server 110 may then retrieve events from event log 120 which are associated with the user provided inputs, and generate a response providing information regarding relevant events back to client 140 over network 130. Client 140 may display the information received from server 110 on timeline graphic 904 in the form of graphic output indicators 908. The graphic output indicators 908 may indicate the relevant events by their relative placement on the timeline graphic 904. For example, a graphic output indicator 908 may be placed on timeline graphic 904 based upon its earliest start time ($t_{nS}$) for $n^{th}$ segment in which it was found, as listed in data structure 230. Additionally, a number may be displayed in each graphic output indicator 908 which may correspond to the count as provided in data structure 230. In other embodiments, the count may be indicated by the size of a graphic output indicator 908.

Once client 140 presents the relevant events to the user on timeline graph 904 as described above, the user may select any graphic output indicator 908 to examine the data associated with the event. For example, if the events are associated with video data, selecting a graphic output indicator 908 can cause the client 140 to further retrieve video associated with the event, and display the video on main video window 902. If multiple cameras are associated with the selected event, the user may select which camera's video to display using camera selection controls 918.

This application incorporates by reference the following applications filed the same day as the present patent application: U.S. application Ser. No. 14/028,118, titled "Control System Configuration Within an Operational Environment"; U.S. application Ser. No. 14/028,236, titled "Anonymous Decisions in an Access Control System"; U.S. application Ser. No. 14/028,243, titled "Consensus Loss in Distributed Control Systems"; U.S. application Ser. No. 14/028,059, titled "Joining a Distributed Database"; U.S. application Ser. No. 14/028,198, titled "Distributed Events in an Access Control System"; U.S. application Ser. No. 14/028,230, titled "Managing Application Data in Distributed Control Systems"; and U.S. application Ser. No. 14/028,208, titled "Distribution of User Credentials".

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 1, 3, 4, and 7, and an order of signal and/or logic have been described with respect to FIGS. 2A, 2B, and 8, the order of the blocks, logic flows, and/or signal flows may be modified in other implementations. Further, non-dependent blocks and/or signal flows may be performed in parallel.

It will be apparent that systems and/or processes, as described above, may be implemented in many different forms of software, firmware, and hardware in the implementations illustrated in the figures. The actual software code or specialized control hardware used to implement these systems and processes is not limiting of the embodiments. Thus, the operation and behavior of the systems and processes were described without reference to the specific software code—it being understood that software and control hardware can be designed to implement the systems and processes based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and "comprising" specify the presence of stated features, integers, steps or components but does not preclude the presence or addition of one or more other features, integers, steps, components or groups thereof. The word "exemplary" is used to mean "serving as an example, instance, or illustration" of more than one example. Any embodiment described herein as "exemplary" does not necessarily imply it to be preferred or advantageous over other embodiments.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a processor for selecting events from an event log for presentation along a timeline, comprising:
   receiving information associated with the timeline to define an interval of interest and a partition size, wherein the received information is indicative of a start time and an end time to define the interval of interest on the timeline;
   dividing the timeline into a plurality of segments based on the partition size;
   determining, for each segment in the plurality of segments along the timeline, if at least one event starts within the corresponding segment and overlaps with the interval of interest wherein the determining further comprises performing a structured query language (SQL) query on the event log to determine events which overlap with the interval of interest to identify events of interest, and performing an SQL query on the event log for each segment to ascertain whether any events of interest start in the queried segment;
   identifying that the corresponding segment includes at least one relevant event therein in response to determining that at least one event starts within the corresponding segment and overlaps with the interval of interest, wherein the identifying comprises classifying the ascertained events as relevant events for the queried segment;
   determining parameters associated with the at least one relevant event for the corresponding segments, based on the identification that the corresponding segments include at least one relevant event therein; and
   providing, to a client device to generate the timeline of the at least one relevant event, the determined parameters along with an index which designates each corresponding segment.

2. The method of claim 1, wherein the determining parameters associated with at least one relevant event for each corresponding segment further comprises:
   determining an earliest start time associated with the at least one relevant event;
   determining a latest end time associated with the at least one relevant event; and
   determining a count of the at least one relevant event.

3. The method of claim 1, wherein the received start time, end time, and partition size are initially defined graphically at the client device.

4. The method of claim 1, wherein the events are represented by data generated by at least one peripheral device.

5. The method of claim 4, further comprising:
   classifying events based on their associated peripheral device; and
   filtering events based on the classification.

6. The method of claim 4, wherein at least one of the peripheral device collects image data, video data, or a combination thereof, along with time data consistent with the timeline.

7. The method of claim 6, further comprising:
   filtering events based on metadata associated with the image or video data, including frames-per-second, resolution, format, and associated audio data.

8. The method of claim 4, further comprising:
   classifying events based on the information determined from the generated data; and
   filtering events based on the classification.

9. The method of claim 8, wherein the filtering is based on metadata generated by the at least one peripheral device, wherein the metadata comprises: position of the peripheral device, identification of the peripheral device, and a media type associated with the event.

10. The method of claim 4, wherein the at least one peripheral device comprises a camera, a window sensor, a door sensor, a temperature controller, a proximity sensor, or any combination thereof.

11. The method of claim 1, wherein the plurality of segments are uniformly distributed along the timeline.

12. An apparatus for selecting events from an event log which are associated with a defined time interval, comprising:
   a processor; and
   a memory, coupled to the processor, which stores instructions causing the processor to
      receive information associated with a timeline to define an interval of interest and a partition size, wherein the received information is indicative of a start time and an end time to define the interval of interest on the timeline, divide the timeline into a plurality of segments based on the partition size, determine, for each segment in the plurality of segments along the timeline, if at least one event starts within the corresponding segment and overlaps with the interval of interest, wherein the instructions to determine further cause the processor to perform a structured query language (SQL) query on the event log to determine events which overlap with the interval of interest to identify events of interest, and perform an SQL query on the event log for each segment to ascertain whether any events of interest start in the queried segment, identify that the corresponding segment includes at least one relevant event therein in response to determining that the at least one event starts within the corresponding segment and overlaps with the interval of interest, wherein the instructions to identify further cause the processor to classify the ascertained events as relevant events for the queried segment, determine parameters associated with the at least one relevant event for the corresponding segments, based on the identification that the corresponding segments include at least one relevant event therein, and provide, to a client device to generate the timeline of the at least one relevant event, the determined parameters along with an index which designates each corresponding segment.

13. The apparatus of claim 12, wherein the instructions for determining parameters associated with at least one relevant event for each corresponding segment comprises further instructions causing the processor to determine an earliest start time associated with the at least one relevant event, determine a latest end time associated with the at least one relevant event, and determine a count of the at least one relevant event.

14. The apparatus of claim 12, wherein the received information indicative of the start time, end time, and partition size are initially defined graphically at the client device.

15. The apparatus of claim 12, wherein the events are represented by data generated by at least one peripheral device.

16. The apparatus of claim 15, wherein the memory further comprises instructions causing the processor to classify events based on their associated peripheral devices, and filter relevant events based on the classification.

17. The apparatus of claim 15, wherein at least one of the peripheral devices collects image data, video data, or a combination thereof, along with time data consistent with the timeline.

18. The apparatus of claim 17, wherein the memory further comprises instructions causing the processor to filter events based on metadata associated with the image or video data, including frames-per-second, resolution, format, and associated audio data.

19. The apparatus of claim 15, wherein the memory further comprises instructions causing the processor to classify events based on the information determined from the generated data, and filter relevant events based on the classification.

20. The apparatus of claim 19, wherein the filtering is based on metadata generated by the at least one peripheral device, and further wherein the metadata comprises: position of the peripheral device, identification of the peripheral device, a media type associated with the event.

21. The apparatus of claim 15, wherein the at least one peripheral device comprises a camera, a window sensor, a door sensor, a temperature controller, proximity sensor, or any combination thereof.

* * * * *